United States Patent
Komaji et al.

(10) Patent No.: US 9,493,060 B2
(45) Date of Patent: Nov. 15, 2016

(54) REAR VEHICLE-BODY STRUCTURE OF VEHICLE

(71) Applicant: MAZDA MOTOR CORPORATION, Hiroshima (JP)

(72) Inventors: Tomohiro Komaji, Higashihiroshima (JP); Kouichi Matsumoto, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/824,889

(22) Filed: Aug. 12, 2015

(65) Prior Publication Data
US 2016/0059683 A1    Mar. 3, 2016

(30) Foreign Application Priority Data
Aug. 29, 2014  (JP) .................. 2014-175141

(51) Int. Cl.
*B60J 7/12*     (2006.01)
*B60J 7/185*    (2006.01)

(52) U.S. Cl.
CPC ............ *B60J 7/1851* (2013.01); *B60J 7/1265* (2013.01)

(58) Field of Classification Search
CPC ............ B60J 7/185; B60J 7/12; B60J 7/20; B60J 7/1265; B60J 7/1851
USPC ................................................ 296/121
See application file for complete search history.

(56) References Cited

U.S. PATENT DOCUMENTS

| 9,227,495 B2* | 1/2016 | Kopp | B60J 7/1851 |
| 2014/0239667 A1* | 8/2014 | Barker | B60J 7/1265 296/116 |
| 2014/0361574 A1* | 12/2014 | Wullrich | E05C 3/12 296/121 |

FOREIGN PATENT DOCUMENTS

| DE | 102007020034 | * 10/2008 | ............ B60J 7/20 |
| JP | 2013-249677 A | 12/2013 | |

* cited by examiner

*Primary Examiner* — Pinel Romain
(74) *Attorney, Agent, or Firm* — Studebaker & Brackett PC

(57) ABSTRACT

A holding device to hold an openable roof when the openable roof is stored is provided at a front portion of a storage partition. There is provided a changing member to change a hook having an open position from its open position to its pre-lock position by being pressed down by the hook taking the open position when the openable roof is operated for storage in the storage partition. The changing member is provided adjacently to the holding device. Thereby, a rear vehicle-body structure of a vehicle which can surely change the hook from its open position to its pre-lock position can be provided.

4 Claims, 10 Drawing Sheets

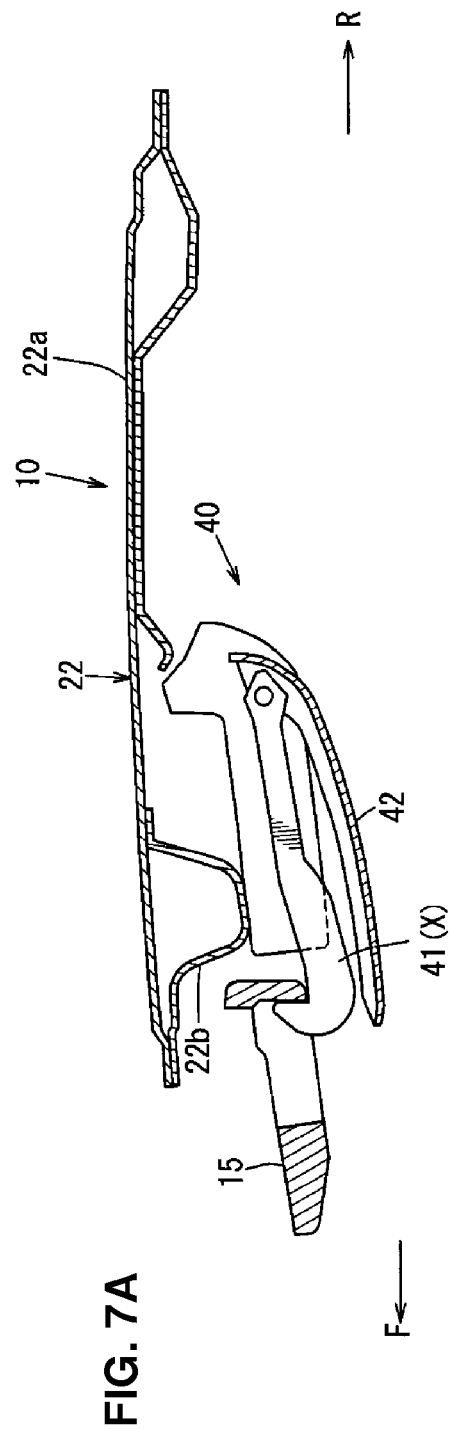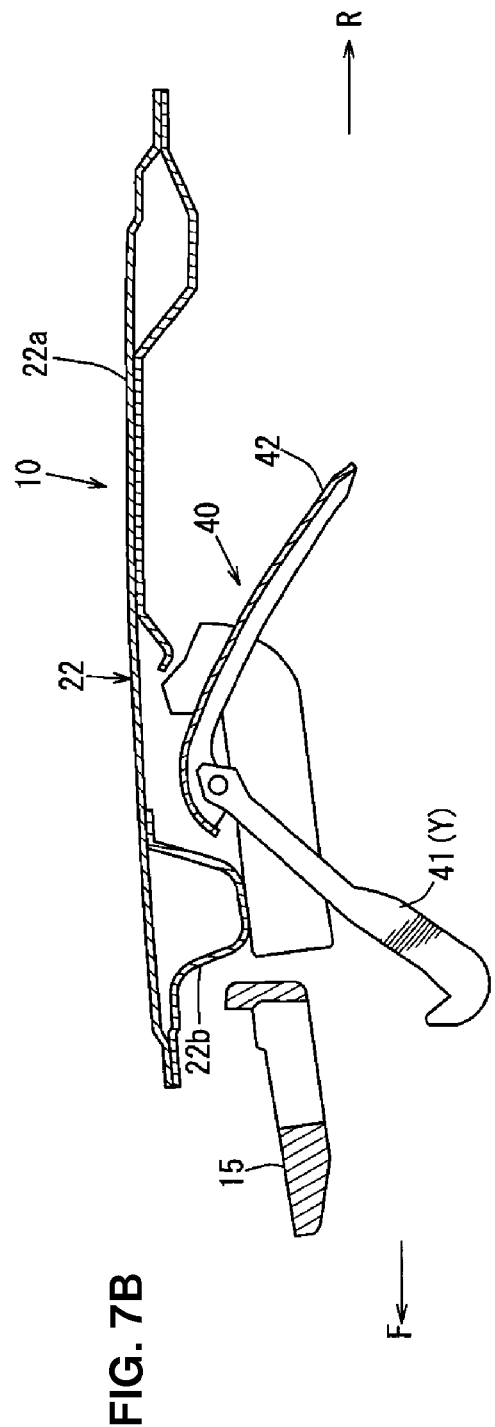
FIG. 7A
FIG. 7B

REAR VEHICLE-BODY STRUCTURE OF VEHICLE

BACKGROUND OF THE INVENTION

The present invention relates to a rear vehicle-body structure of a vehicle, which comprises an openable roof provided at an upper portion of the vehicle, a hook to be engaged with or disengaged from an engaged portion provided on a vehicle-body side, such as a striker provided at a front header, and a storage partition provided at a rear portion of the vehicle and storing the openable roof therein.

In general, in a roof structure of the vehicle equipped with an openable roof capable of opening and closing an upper portion of the vehicle, there is provided a fixing device to make a front portion of the openable roof be engaged with or disengaged from the striker provided at the front header when the openable roof closes the vehicle upper portion. This fixing device comprises a hook to be engaged with or disengaged from the striker at the front header and an operational lever to operate the hook. In a case in which the openable roof in a state where the hook of the fixing device is engaged with the striker at the front header (i.e., in a lock state) is stored in the storage partition at the vehicle's rear portion, the roof is operated in an open state by operating the operational lever so as to unlock the hook first, then the roof is moved rearward toward the storage partition at the vehicle's rear portion, and finally the roof is folded and stored into the storage partition. In this storage state of the openable roof, both the hook and the operational lever of the fixing device take their open positions.

In a case in which the openable roof in the storage state is moved upward and forward so as to close the vehicle's upper portion, the roof is closed keeping the hook and the operational lever of the fixing device in their open positions, and then the operational lever is operated so that the hook can be engaged with the striker at the front header (i.e., hooking). Subsequently, a free end of the operational lever is rotated forward so as to move the hook rearward, so that the hook can be completely engaged with the striker at the front header (i.e., locking).

According to the above-described conventional structure, however, two actions are required in order to make the hook be engaged with the striker at the front header as an engaged portion provided on a vehicle-body side (i.e., both an operation of the operational lever for getting the hook engaged with the striker and a forward-rotational operation of the operational level for completing the locking of the hook with the striker). Therefore, there is a problem in that the operability of the conventional structure may be inferior.

A fixing device of a roof member disclosed in Japanese Patent Laid-Open Publication No. 2013-249677 has been invented in order to solve the above-described problem. That is, this fixing device is configured such that the hook is selectable among three positions, i.e., a lock position, an open position, and a pre-lock position, according to the operation of the operational lever. Herein, the lock position is a position where the hook is completely engaged with the striker at the front header, the open position is a position where the hook is disengaged from the striker at the front header by being rotated rearward from the lock position, and the pre-lock position is a position where the hook is located between its lock position and its open position so as to be engaged with the striker at the front header. Meanwhile, there is a provided a rear frame which extends in the vehicle width direction at a front portion of the storage partition of the openable roof and has a convex-shaped cross section, and a press portion of the hook is formed at this rear frame. Herein, this fixing device is configured such that the hook having its open position is pressed against the press portion of the rear frame from above so that the hook can be changed from its open position to its pre-lock position.

According to the above-described conventional device disclosed in the patent document, since the hook of the fixing device is changed from its open position to its pre-lock position by being pressed against the press portion, in a case in which the roof in the storage state is moved upward and forward so that the roof can close the upper portion of the vehicle, the hook gets engaged with the striker at the front header without any operation of the operational lever when the roof is closed, keeping the hook in its pre-lock position. Accordingly, by rotating the free end of the operational lever forward, the hook is moved rearward, so that the hook can be completely engaged with the striker at the front header. Thus, the operability can be improved greatly.

However, the conventional device disclosed in the patent document has a problem described below. That is, since the openable roof is slightly twisted when being stored in the storage partition through a manual operation, it may be required to strictly set a relative position in both the vertical direction and the lateral direction (vehicle width direction) between the stored openable roof and the press portion at the rear frame. In this regard, there still exists room for improvement.

SUMMARY OF THE INVENTION

Accordingly, an object of the present invention is to provide a rear vehicle-body structure of a vehicle which can surely change the hook from its open position to its pre-lock position.

The present invention is a rear vehicle-body structure of a vehicle, comprising an openable roof provided at an upper portion of the vehicle, a fixing device provided at a front portion of the openable roof, the fixing device comprising a hook to be engaged with or disengaged from an engaged portion provided on a vehicle-body side and an operational lever to operate the hook, the fixing device being configured such that the hook is selectable among a lock position, an open position, and a pre-lock position thereof according to an operation of the operational lever, the lock position being a position where the hook is completely engaged with the engaged portion, the open position being a position where the hook is disengaged from the engaged portion by being rotated rearward from the lock position, the pre-lock position being a position where the hook is located between the lock position and the open position so as to be engaged with the engaged portion, a storage partition provided at a rear portion of the vehicle and storing the openable roof therein, a holding device provided at a front portion of the storage partition and holding the openable roof when the openable roof is stored in the storage partition, and a hook-position changing member to change the position of the hook from the open position to the pre-lock position by being pressed down by the hook taking the open position when the openable roof is operated for storage in the storage partition, the hook-position changing member being provided adjacently to the holding device.

According to the present invention, since the hook-position changing member which is configured to change the hook of the fixing device from its open position to its pre-lock position when the openable roof is stored is provided adjacently to the holding device, the hook-position changing member comes to be located near the openable roof whose position can be surely set by the holding device. Consequently, the hook of the fixing device can be surely changed from its open position to its pre-lock position when the openable roof is stored.

Herein, the above-described hook-position changing member may be preferably a protruding piece which is integrally formed with the holding device.

In an embodiment of the present invention, the holding device is fixed to an upper portion of a cross member of the vehicle.

According to this embodiment, since the holding device is fixed to the cross member having a relatively high rigidity, both improvement of the positioning accuracy of the holding device and improvement of support rigidity of the holding device can be attained.

In another embodiment of the present invention, periphery of the holding device is covered with a trim member, and the hook-position changing member is configured to be exposed from the trim member.

This embodiment provides the following effect. That is, since the rigidity of the trim member is relatively low, the hook can be surely changed from its open position to its pre-lock position by configuring such that the hook is pressed against the hook-position changing member having the relatively high rigidity, not against the trim member having the relatively low rigidity.

Other features, aspects, and advantages of the present invention will become apparent from the following description which refers to the accompanying drawings.

BRIEF DESCRIPTION OF THE DRAWINGS

FIGS. 7A and 7B are side views showing positions of the hook: FIG. 7A showing a lock position in which the hook is completely engaged with an engaged portion provided on a vehicle-body side; FIG. 7B showing an open position in which the hook is disengaged from the engaged portion provided on the vehicle-body side.

DETAILED DESCRIPTION OF THE INVENTION

Figure 3:
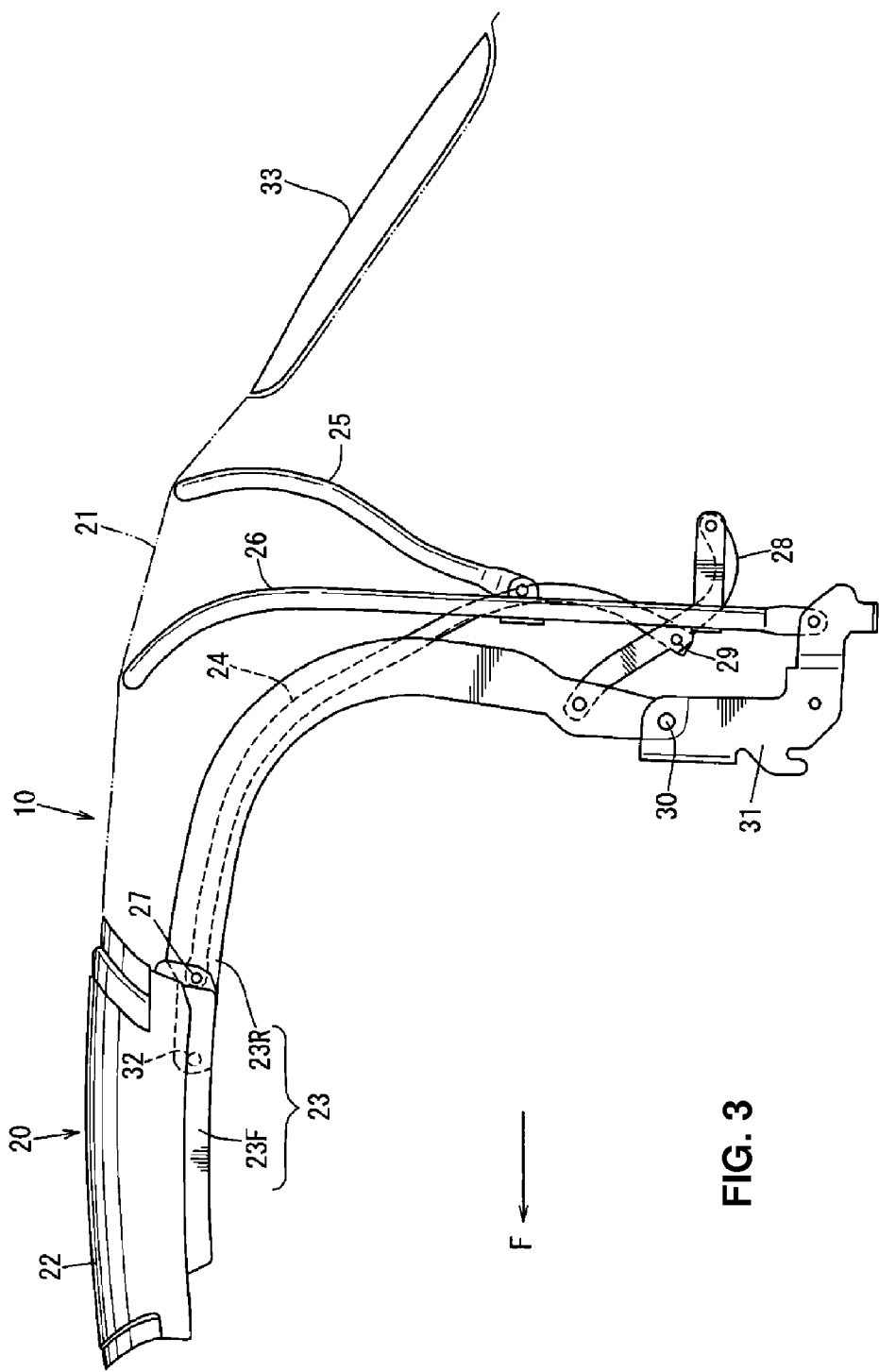
FIG. 3 is a side view showing a structure of a convertible-top frame when the openable roof is closed.
Figure 4:
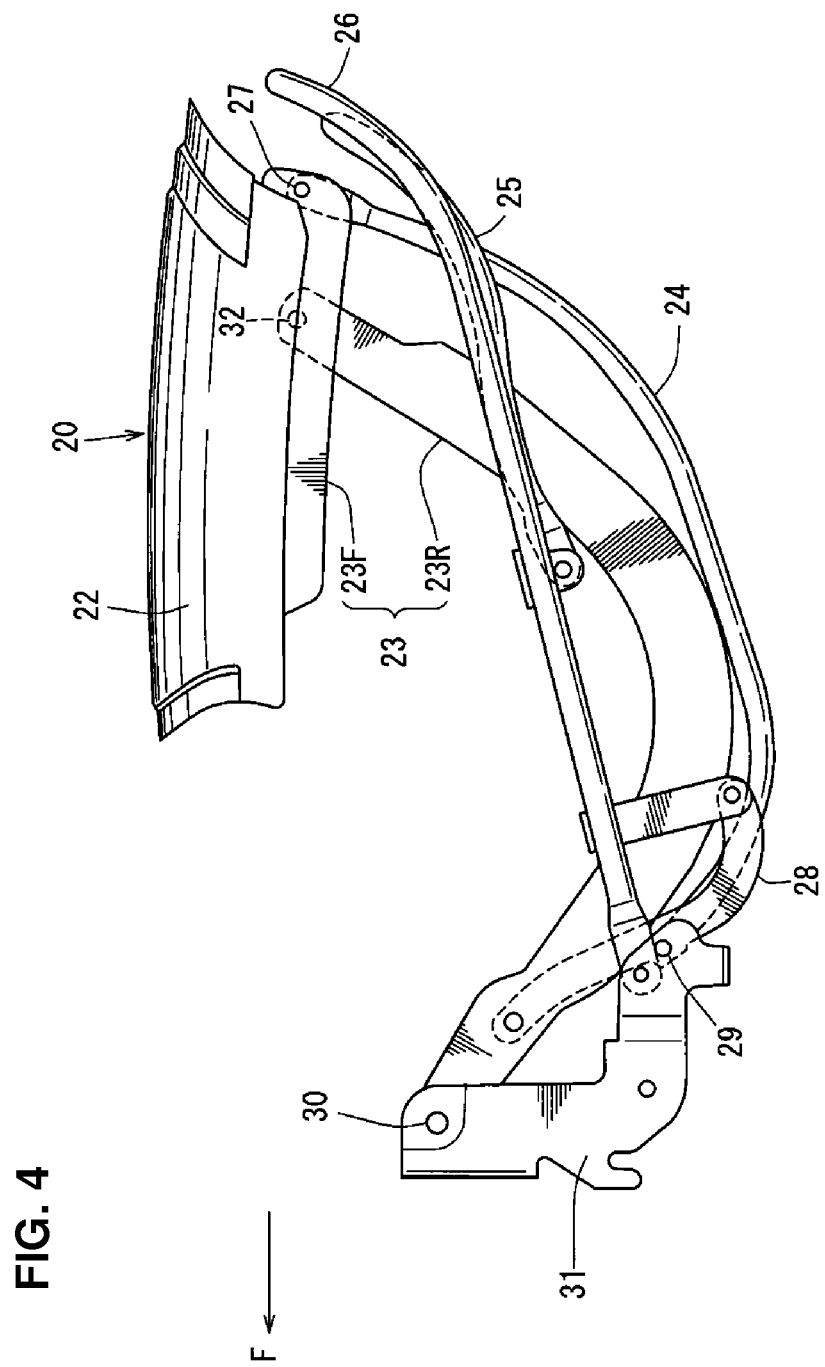
FIG. 4 is a side view showing the structure of the convertible-top frame when the openable roof is stored.

Hereafter, an embodiment of the present invention will be described specifically referring to the drawings. The drawings show a rear vehicle-body structure of a vehicle, FIG. 1 is a side view of an openable roof of the vehicle having the rear vehicle-body structure when the openable roof is closed, FIG. 2 is a side view of the openable roof when the openable roof is stored, FIG. 3 is a side view showing a structure of a convertible-top frame when the openable roof is closed, and FIG. 4 is a side view showing the structure of the convertible-top frame when the openable roof is stored.

Figure 1:
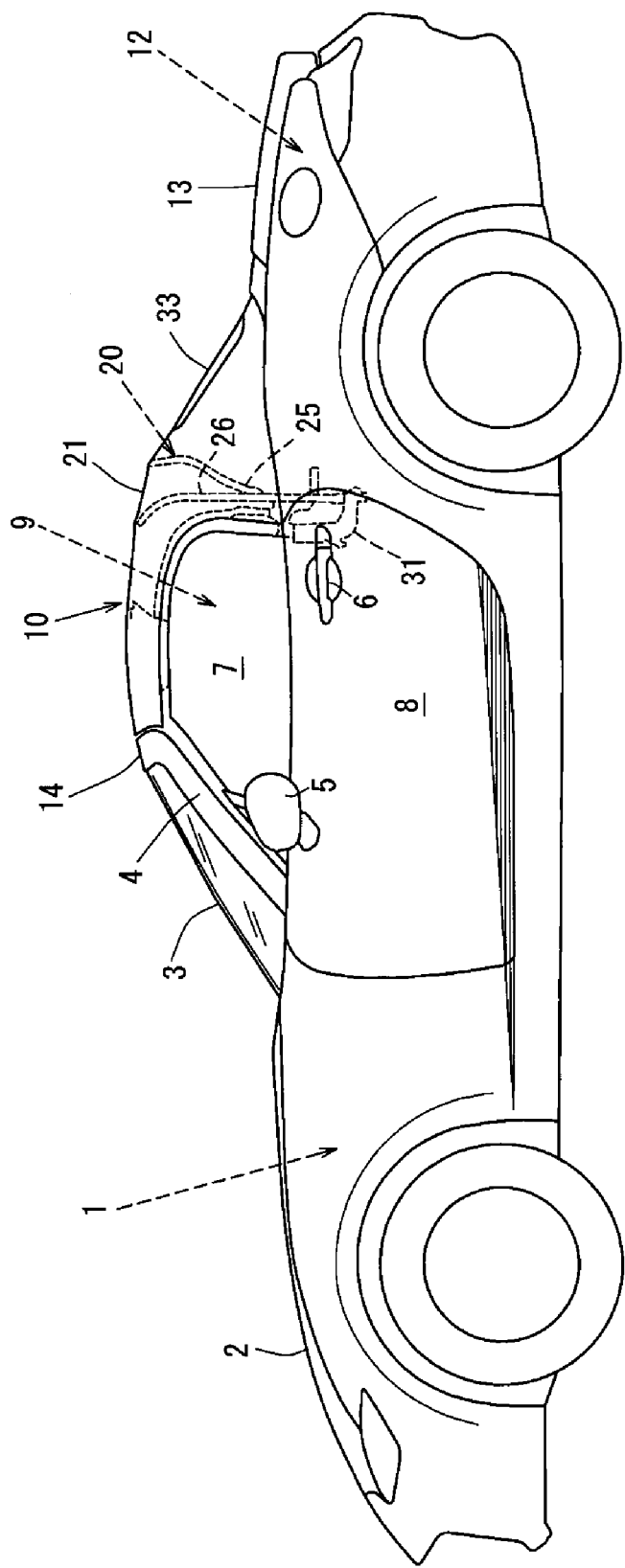
FIG. 1 is a side view of an openable roof of a vehicle having a rear vehicle-body structure of the present invention when the openable roof is closed.
Figure 2:
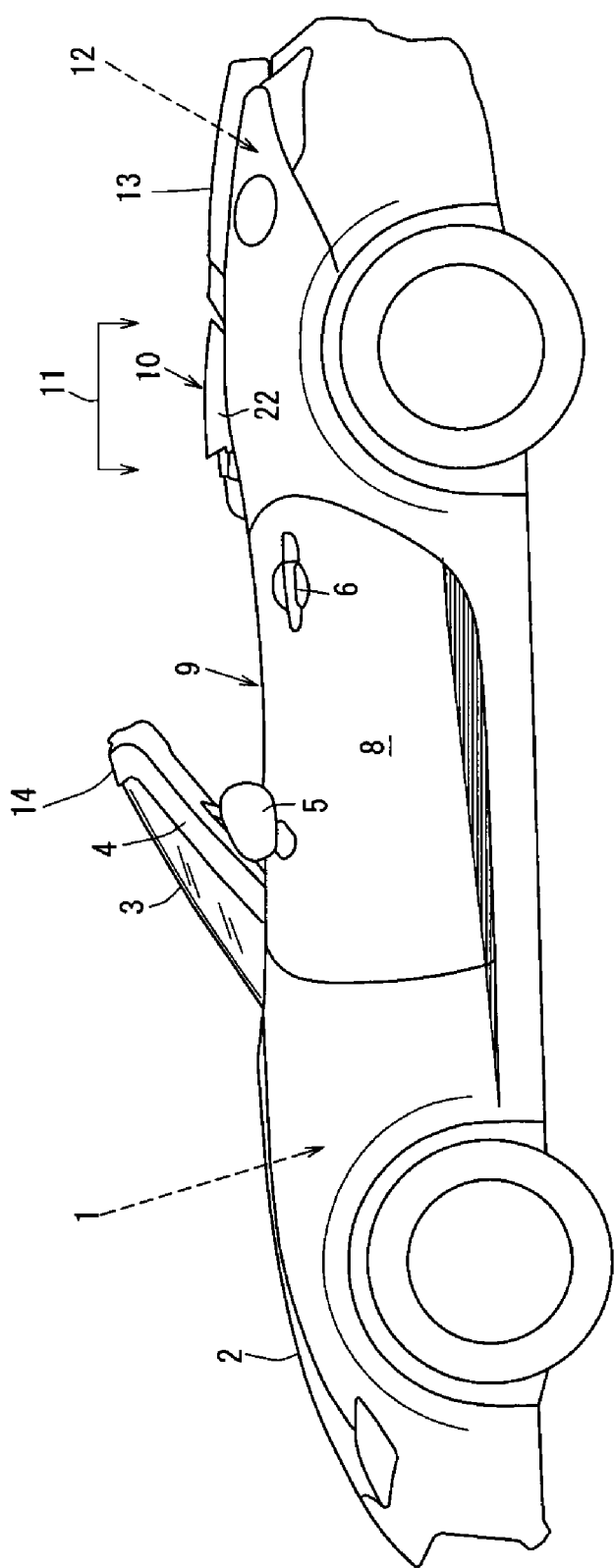
FIG. 2 is a side view of the openable roof when the openable roof is stored.

In FIGS. 1 and 2, an openable engine hood (bonnet) 2 which covers over an engine room 1 is provided, a windshield (front window member) 3 which extends rearward and upward from a cowl portion provided on a vehicle-body side is provided, and the windshield 3 is supported at a front pillar 4. A lower portion of the front pillar 4 is connected to a hinge pillar which extends vertically at a vehicle-body side portion and has a closed cross section. To this hinge pillar is pivotally connected a side door 8 equipped with a door mirror 5, a door outer handle 6a and a door glass 7 so as to open or close.

A vehicle compartment 9 of the vehicle is formed by a floor panel positioned at a lower portion, a dash lower panel (dash panel) positioned at a front portion, a rear bulkhead positioned at a rear portion, and the right-and-left side doors 8, in which a driver's seat and a passenger's seat are installed.

As shown in FIGS. 1 and 2, an openable roof 10 is provided so as to open or close an opening portion of the above-described vehicle compartment 9 (i.e., an upper portion of the vehicle). This openable roof 10 comprises a convertible-top frame 20 which is expandable and storable and a convertible-top cloth 21 which covers over the convertible-top frame 20.

As shown in FIG. 2, a storage partition 11 to store the openable roof 10 therein is formed at a rear portion of the vehicle compartment 9, and a trunk room (baggage compartment) 12 is formed behind the storage partition 11, and this trunk room 12 is covered with an openable trunk lid 13. This trunk lid 13 is pivotally connected at its front portion such that its rear portion opens or closes.

Next, a structure of the convertible-top frame 20 will be described referring to FIGS. 3 and 4. The convertible-top frame 20 comprises, as shown in FIGS. 3 and 4, a top frame 22 which extends in a vehicle width direction at a front end of the convertible-top frame 20 and is detachably fixed to a front header 14 (see FIGS. 1 and 2) positioned at an upper end of the windshield 3, a pair of right-and-left side frames 23 which are fixed to right-and-left both sides of the top frame 22 and extend in a curve shape along opening peripheries of the door glasses 7 (see FIG. 1), a pair of right-and-left control link 24 which control respective holding movements of a pair of front frames 23F and a pair of rear frames 23R which form together the pair of right-and-left side frames 23, and plural convertible-top ribs 25, 26 which are provided to extend between the right-and-left side frames 23, 23.

The above-described control link 24 is configured such that its one end is coupled to a rear end of the front frame 23F by a pin 27 and the other end is coupled to a link bar 28 by a pin 29.

The front frame 23F of the side frame 23 is positioned on the side of the top frame 22 and this front frame 23F is a frame which corresponds to an upper-edge front portion of an opening for the door glass 7, which is of a roughly straight shape.

Meanwhile, the rear frame 23R is a frame which corresponds to a rear edge extending vertically from an upper-edge rear portion of the opening for the door glass 7, which is of a roughly-perpendicular curve shape. A base portion of the rear frame 23R is pivotally coupled to a base bracket 31 provided on the vehicle-body side by a pin 30, and a tip portion of the rear frame 23R is pivotally coupled to a rear portion of the front frame 23F by a pin 32.

When the convertible-top frame 20 comprising the front frame 23F and the rear frame 23R is in a top expansion state, as shown in FIG. 3, the rear frame 23R rises from the side of the pin 30 with its tip portion being directed forward, and the front frame 23F extends forward further from a tip of the rear frame 23R, so that the convertible-top frame 20 becomes a curve-shaped body extending along the above-described opening peripheries of the door glasses 7.

When the convertible-top frame 20 is position-changed from the top expansion state (see FIG. 3) to the top storage state (see FIG. 4), the rear frame 23R of the side frame 23 is rotated rearward around the pin 30 provided at its base portion, and the front frame 23F is folded at the portion of the pin 32 and then moved rearward gradually by a control function of the above-described control link 24 according to the rearward rotation of the rear frame 23R, keeping its roughly horizontal position.

Then, in the top storage state, as shown in FIG. 4, the front frame 23F is finally located above the rear frame 23R which has been rotated rearward, having its roughly horizontal position.

In FIG. 3, the above-described convertible-top cloth 21 covers a whole part of an upper face of the top frame 2, extends toward the vehicle-body side from upper faces of top portions of the convertible-top ribs 26, 25, and is attached to a rain rail (not illustrated) provided right below a beltline, and a window member 33 (a so-called back window) is attached to a rear-face portion of the convertible-top cloth 21 between the convertible-top frame 25 and the rain rail. Herein, while illustration of the convertible-top cloth 21 is omitted in FIG. 4, the convertible-top cloth 21 is folded and stored between the elements 22, 26, 25 and the rain rail.

Figure 5:
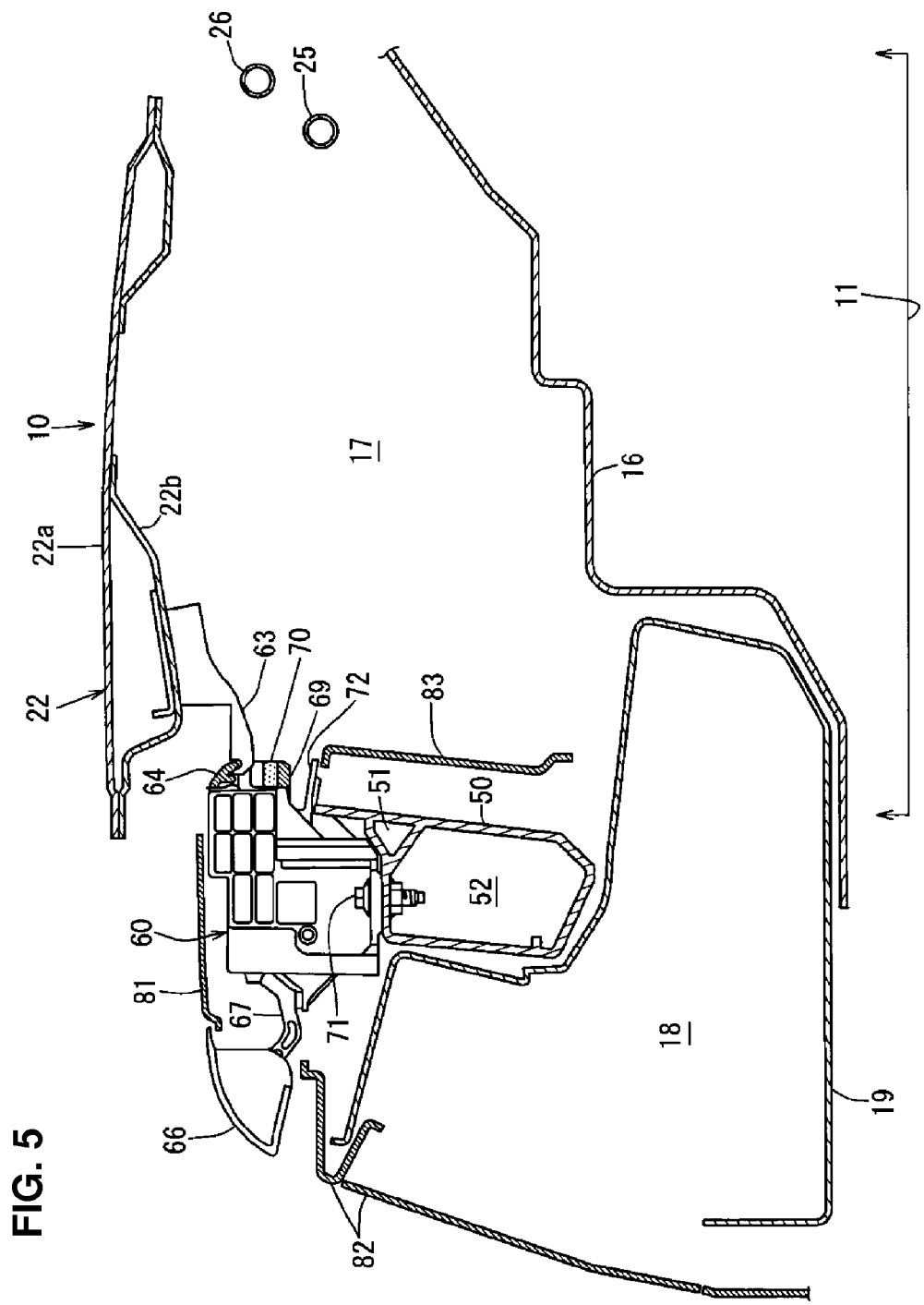
FIG. 5 is a side view showing a state in which the openable roof is held at a holding device.
Figure 6:
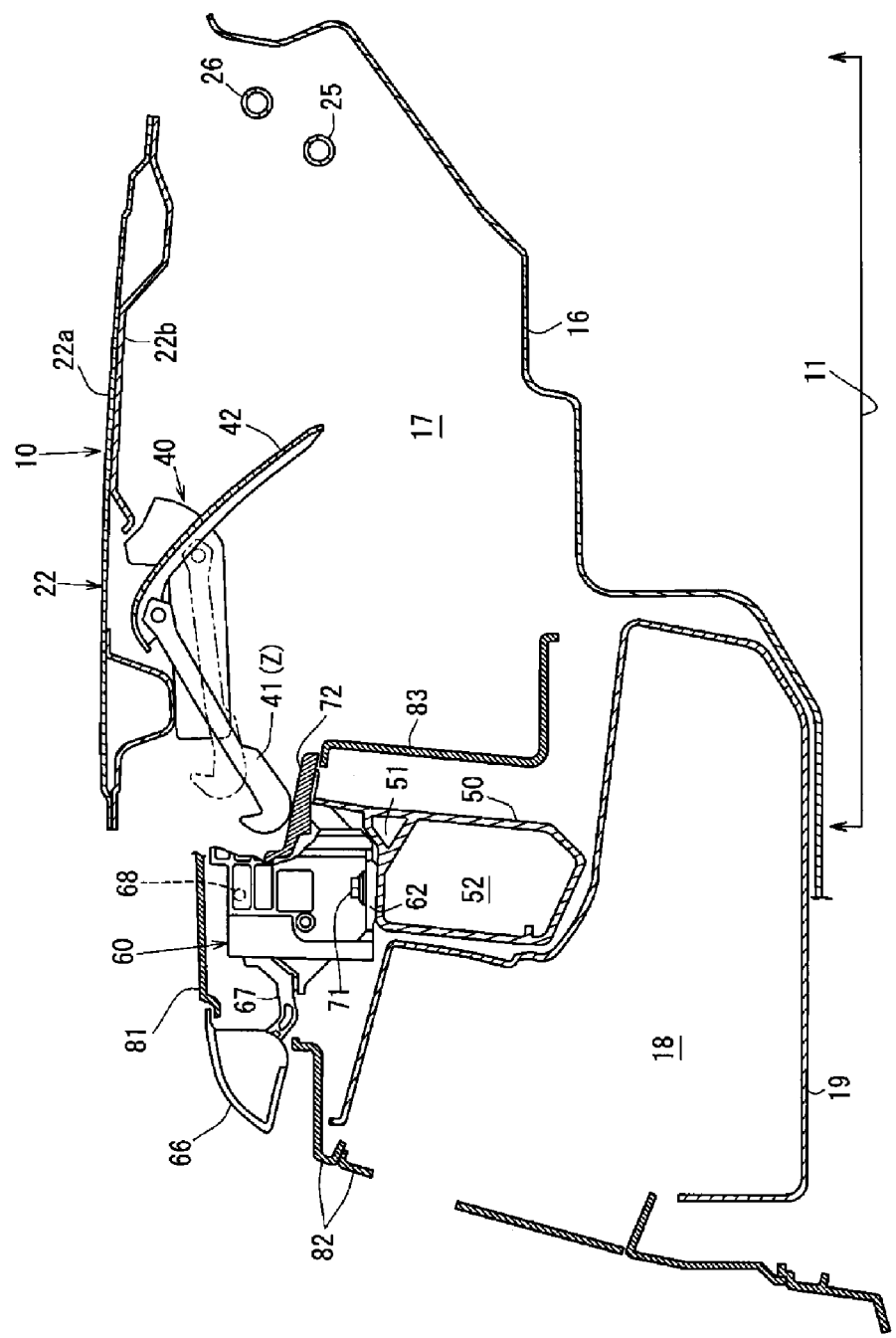
FIG. 6 is a side view showing a state in which a hook provided at the openable roof is changed from its open position to its pre-lock position.

FIG. 5 is a side view showing a state in which the openable roof is held at a holding device, FIG. 6 is a side view showing a state in which a hook provided at the openable roof is changed from its open position to its pre-lock position, and FIGS. 7A and 7B are side views showing positions of the hook: FIG. 7A showing a lock position in which the hook is completely engaged with an engaged portion provided on a vehicle-body side; FIG. 7B showing an open position in which the hook is disengaged from the engaged portion provided on the vehicle-body side.

As shown in FIGS. 5-7, the above-described top frame 22 is formed by joining a top frame outer panel 22a and a top frame inner panel 22b, and a fixing device 40 which comprises a hook 41 to be engaged with or disengaged from a striker 15 provided at the front header 14 as an engaged portion provided on a vehicle-body side is attached to a lower portion of a front side of a central portion, in the vehicle width direction, of the top frame inner panel 22b. The above-described fixing device 40 comprises the above-described hook 41 and an operational lever 42 to operate the hook 41.

Further, the fixing device 40 is configured such that the hook 41 is selectable among three positions, i.e., a lock position X (see FIG. 7A), an open position Y (see FIG. 7B), and a pre-lock position Z (see FIG. 6), according to an operation of the operational lever 42. Herein, the lock position X is a position where the hook 41 is completely engaged with the striker 15 as the engaged portion provided on the vehicle-body side, the open position Y is a position where the hook 41 is disengaged from the striker 15 by being rotated rearward from the lock position X, and the pre-lock position Z is a position where the hook 41 is located between the lock position X and the open position Y so as to be engaged with the striker 15. Herein, a specific structure of the fixing device 40 comprising the hook 41 and the operational lever 42 is equivalent to the structure disclosed in the above-described patent document.

As shown in FIGS. 5 and 6, a rear floor panel 16 which forms a bottom wall of the above-described storage partition 11 is provided, and an upper portion of this rear floor panel 16 is a storage space 17 of the openable roof 10. A storage box 19 which includes a storage space 18 therein is arranged at a lower portion of a front side of the storage space 17. A cross member 50 which extends in the vehicle width direction and has a closed cross section is provided at a front portion of the storage space 17 at a position corresponding to a central portion, in the vehicle width direction, of the storage box 19.

The cross member 50 has plural closed cross sections 51, 52, and its right-and-left both end portions are connected to rigidity members at vehicle-side portions. In this embodiment, the cross member 50 is made of an aluminum or aluminum alloy extrusion-molded article.

Figure 8:
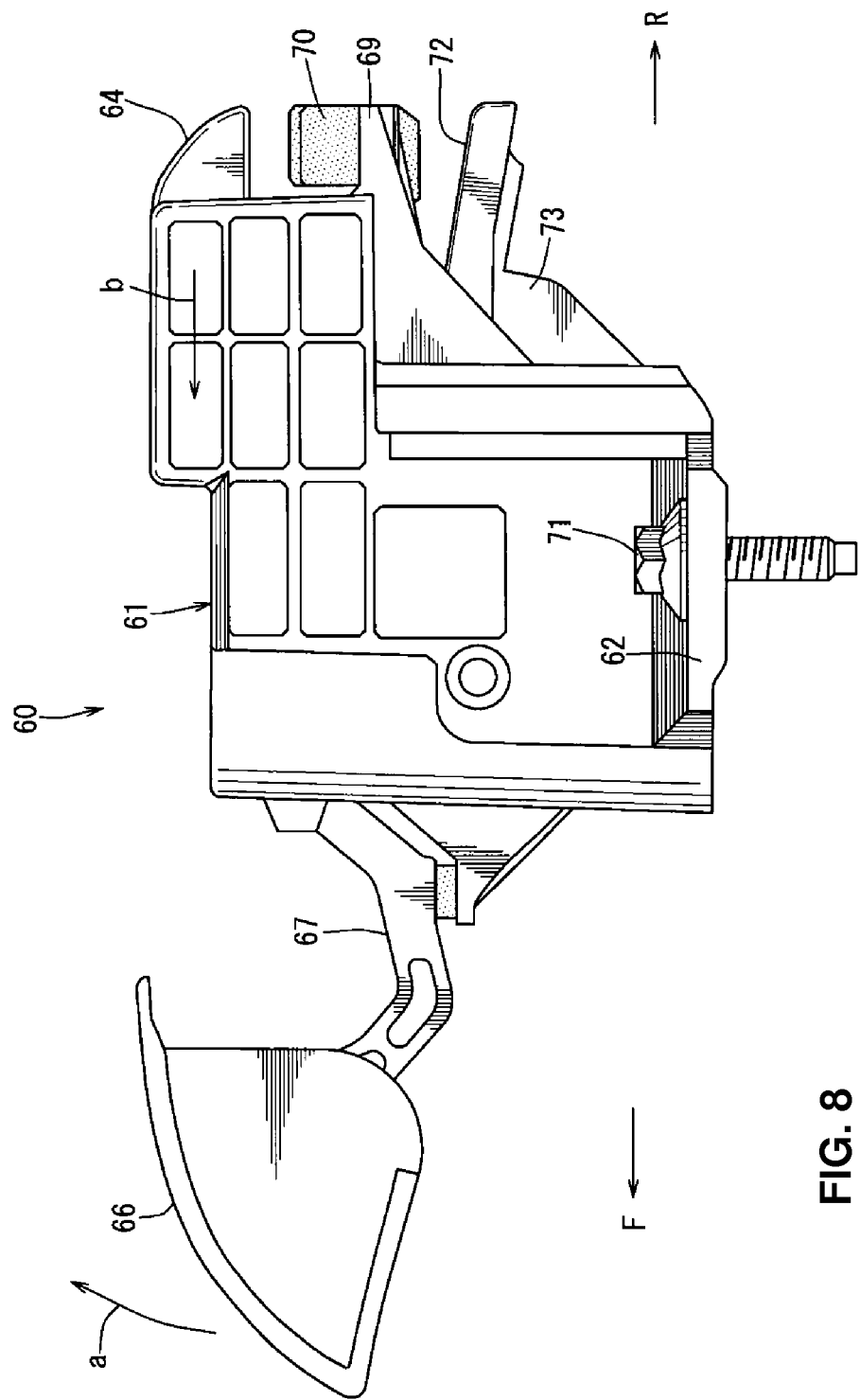
FIG. 8 is a side view of the holding device.
Figure 9:
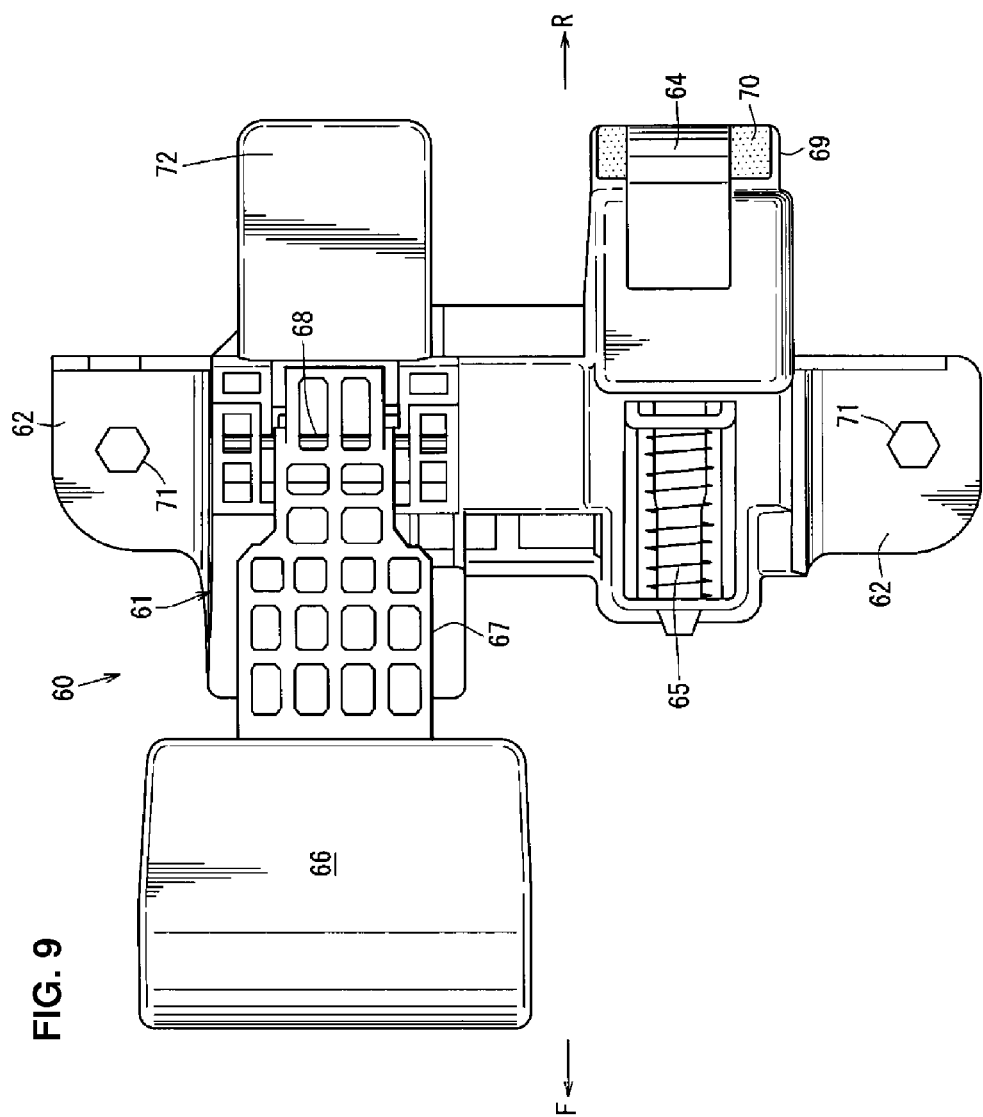
FIG. 9 is a plan view of the holding device.
Figure 10:
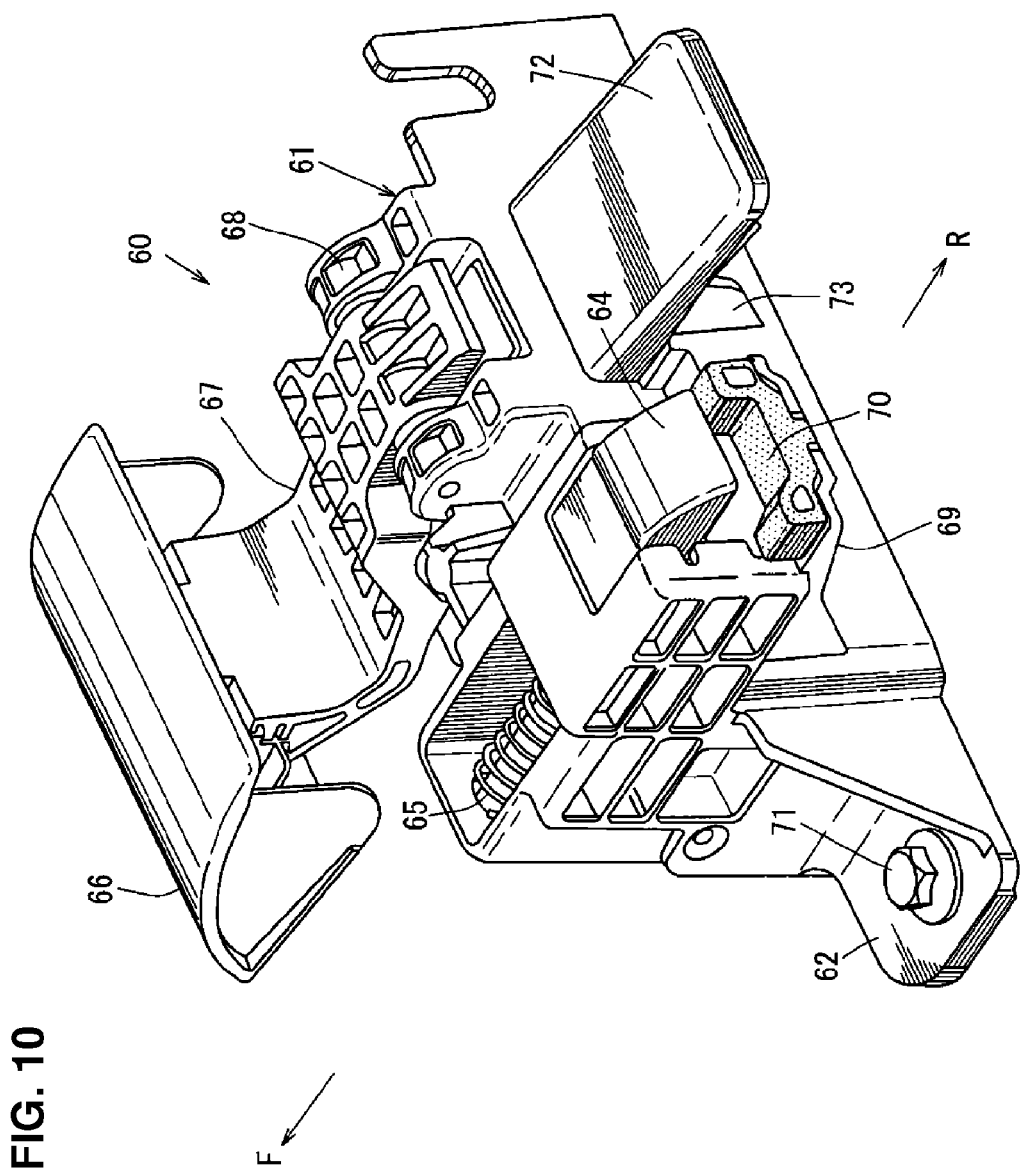
FIG. 10 is a perspective view of the holding device.

FIG. 8 is a side view of the holding device, FIG. 9 is a plan view of the holding device, and FIG. 10 is a perspective view of the holding device.

As shown in FIGS. 5 and 6, a holding device 60 to hold the openable roof 10 when the operable roof 10 is stored is arranged at a front portion of the above-described storage partition 11, i.e., a front portion of the storage space 17.

As shown in FIGS. 5 and 6, the holding device 60 is fixedly fastened to an upper portion of the cross member 50. The holding device 60 comprises, as shown in FIGS. 8, 9 and 10, a device body 61, attaching pieces 62, 62 which are integrally formed at both sides, in the vehicle width direction, of the device body 61, an engaging claw 64 which a hook member 63 (see FIG. 5) provided on the side of the top frame inner panel 22b is engaged with when the openable roof 10 is stored, a spring 65 which pushes the engaging claw 64 toward an engagement direction, i.e., rearward, all the time, an arm 67 which has an operational portion 66 to be manually operated, and a support axis 68 of the arm 67. The above-described holding device 60 is made from fiberglass reinforced plastic (so-called GFRP) so as to have a light weight and high rigidity.

Further, a shock absorbing member 70 which is supported by a retainer 69 integrally formed at the device body 61 is arranged below the above-described engaging claw 64. This shock absorbing member 70 is configured to absorb shock derived from a vertical movement of the openable roof 10 which is caused by vibrations of the vehicle traveling via the hook member 63.

The pair of right-and-left attaching pieces 62, 62 of the holding device 60 are fixed to the upper portion of the cross member 50 shown in FIGS. 5 and 6 by means of bolts 71, 71 as attaching members. Positioning of the openable roof 10 is achieved by the hook member 63 provided at the openable roof 10 being engaged with the engaging claw 64 of the holding device 60 when the openable roof 10 is stored in the storage partition 11 as shown in FIG. 5.

Meanwhile, in a case in which the engagement of the hook member 63 with the engaging claw 64 of the holding device 60 is released, the arm 67 is rotated around the support axis 68 clockwise by operating the operational portion 66 in an arrow a direction of shown in FIG. 8, so that an engaged portion, not illustrated, which is integrally formed at a portion of the arm 67 located rearward of the support axis 68 moves the engaging claw 64 forward (in an arrow b direction) against a biasing force of the spring 65. Thereby, the engagement of the hook member 63 with the engaging claw 64 can be released.

Further, as shown in FIGS. 6, 8, 9, and 10, a tongue-shaped contact portion (i.e., protruding piece) 72 as a changing member to change the hook 41 of the fixing device 40 from its open position Y (see FIG. 7B) to its pre-lock position Z (see FIG. 6) when the openable roof 10 is stored is integrally formed with the device body 61 adjacently to the engaging claw 64 of the holding device 60. That is, this contact portion 72 is also made from fiberglass reinforced plastic (firm resin member).

As shown in FIGS. 8 and 10, between a lower portion of the contact portion 72 and the device body 61 is provided a rib 73 integrally formed with the device body 61. The support rigidity of the contact portion 72 is improved by the rib 73.

As shown in FIG. 7A, when the free end of the operational lever 42 is rotated rearward from the lock position X where the hook 41 is completely engaged with the striker 15 provided at the front header 14, the hook 41 takes its open position Y as shown in FIG. 7B.

When the openable roof 10 is moved from the expansion state to the storage state in a state in which the hook 41 takes its open position Y, the hook 41 contacts the contact portion 72. Then, when the hook 41 is pressed against the contact portion 72 from above for the storage of the openable roof 10, the hook 41 is changed from its open position Y to its pre-lock position Z.

In the present embodiment, the contact portion 72 of the holding device 60 and the hook 41 of the fixing device 40 are provided at a central position in the vehicle width direction, the engaging claw 64 of the holding device 60 and hook member 63 provided at the openable roof 10 are provided at a leftward-offset position relative to the contact portion 72 and the hook 41.

As shown in FIGS. 5 and 6, a periphery, i.e., an upper portion, a front portion, and a rear portion, of the holding device 60 are covered with an upper trim 81, a front trim 82, and a rear trim 83. Meanwhile, the contact portion 72 as the changing member, the engaging claw 64, the shock-absorbing member 70, and the retainer 69 are exposed from the upper trim 81 and the rear trim 83. In particular, the hook 41 of the fixing device 40 is configured to directly contact the contact portion 72 having the high rigidity, not the trim member having a relatively low rigidity. In the figures, an arrow F shows a forward direction of the vehicle, and an arrow R shows a rearward direction of the vehicle.

As described above, the rear vehicle-body structure of the vehicle of the present embodiment comprises the openable roof 10 provided at the upper portion of the vehicle, the fixing device 40 provided at the front portion of the openable roof 10, the fixing device 40 comprising the hook 41 to be engaged with or disengaged from the engaged portion (see the striker 15) provided on the vehicle-body side and the operational lever 42 to operate the hook 41, the fixing device 40 being configured such that the hook 41 is selectable among the lock position X (see FIG. 7A), the open position Y (see FIG. 7B), and the pre-lock position Z (see FIG. 6) according to the operation of the operational lever 42, the lock position X being the position where the hook 41 is completely engaged with the engaged portion (striker 15), the open position Y being the position where the hook 41 is disengaged from the engaged portion (striker 15) by being rotated rearward from the lock position X, the pre-lock position Z being the position where the hook 41 is located between the lock position X and the open position Y so as to be engaged with the engaged portion (striker 15), the storage partition 11 provided at the rear portion of the vehicle and storing the openable roof 10 therein, the holding device 60 provided at the front portion of the storage partition 11 and holding the openable roof 10 when the openable roof 10 is stored in the storage partition 11, and the hook-position changing member (see the contact portion 72) to change the position of the hook 41 from the open position Y to the pre-lock position Z by being pressed down by the hook 41 taking the open position Y when the openable roof 10 is operated for storage in the storage partition 11, the hook-position changing member (contact portion 72) being provided adjacently to the holding device 60 (see the engaging claw 64 particularly) (see FIGS. 6, 7 and 9).

According to the present embodiment, since the hook-position changing member (contact portion 72) which is configured to change the hook 41 of the fixing device 40 from its open position Y to its pre-lock position Z when the openable roof 10 is stored is provided adjacently to the holding device 60 (the engaging claw 64 particularly), the hook-position changing member (contact portion 72) comes to be located near the openable roof 10 whose position can be surely set by the holding device 60. Consequently, the hook 41 of the fixing device 40 can be surely changed from its open position Y to its pre-lock position Z when the openable roof 10 is stored.

The holding device 60 is fixed to the upper portion of the cross member 50 (see FIGS. 5 and 6). Since the holding device 60 is fixed to the cross member 50 having a relatively high rigidity, both improvement of the positioning accuracy of the holding device 60 and improvement of support rigidity of the holding device 60 can be attained.

Further, the periphery of the holding device 60 is covered with the trim members (see the trims 81, 82, 83), and the hook-position changing member (see the contact portion 72) is configured to be exposed from the trim members (see FIG. 6).

The present embodiment provides the following effects. That is, since the rigidity of the trims 81, 83 is relatively low, the hook 41 can be surely changed from its open position Y to its pre-lock position Z by configuring such that the hook 41 is pressed against the hook-position changing member (contact portion 72) having the relatively high rigidity, not against the trim having the relatively low rigidity.

The engaged portion provided on the vehicle-body side of the present invention corresponds to the striker 15 provided at the front header 14 of the above-described embodiment. Likewise, the changing member corresponds to the contact portion 72, and the trim member corresponds to the trims 81, 82, 83.

The present invention should not be limited to the above-described embodiment, and any other modifications or improvements may be applied within the scope of a spirit of the present invention.

What is claimed is:

1. A rear vehicle-body structure of a vehicle, comprising:
an openable roof provided at an upper portion of the vehicle;
a fixing device provided at a front portion of the openable roof, the fixing device comprising a hook to be engaged with or disengaged from an engaged portion provided on a vehicle-body side and an operational lever to operate the hook, the fixing device being configured such that the hook is selectable among a lock position, an open position, and a pre-lock position thereof according to an operation of the operational lever, the lock position being a position where the hook is completely engaged with the engaged portion, the open position being a position where the hook is disengaged from the engaged portion by being rotated rearward from the lock position, the pre-lock position being a position where the hook is located between the lock position and the open position so as to be engaged with the engaged portion;

a storage partition provided at a rear portion of the vehicle and storing the openable roof therein;

a holding device provided at a front portion of the storage partition and holding the openable roof when the openable roof is stored in the storage partition; and a hook-position changing member to change the position of the hook from the open position to the pre-lock position by being pressed down by the hook taking the open position when the openable roof is operated for storage in the storage partition, the hook-position changing member being provided adjacently to said holding device, wherein said hook-position changing member is a protruding piece which is integrally formed with said holding device.

2. The rear vehicle-body structure of a vehicle of claim 1, wherein said holding device is fixed to an upper portion of a cross member of the vehicle.

3. The rear vehicle-body structure of a vehicle of claim 2, wherein periphery of said holding device is covered with a trim member, and said hook-position changing member is configured to be exposed from the trim member.

4. The rear vehicle-body structure of a vehicle of claim 1, wherein periphery of said holding device is covered with a trim member, and said hook-position changing member is configured to be exposed from the trim member.

* * * * *